Dec. 2, 1947.　　J. A. GUYER ET AL　　2,431,803
CATALYST CHAMBER CONSTRUCTION
Filed April 24, 1943　　2 Sheets-Sheet 1
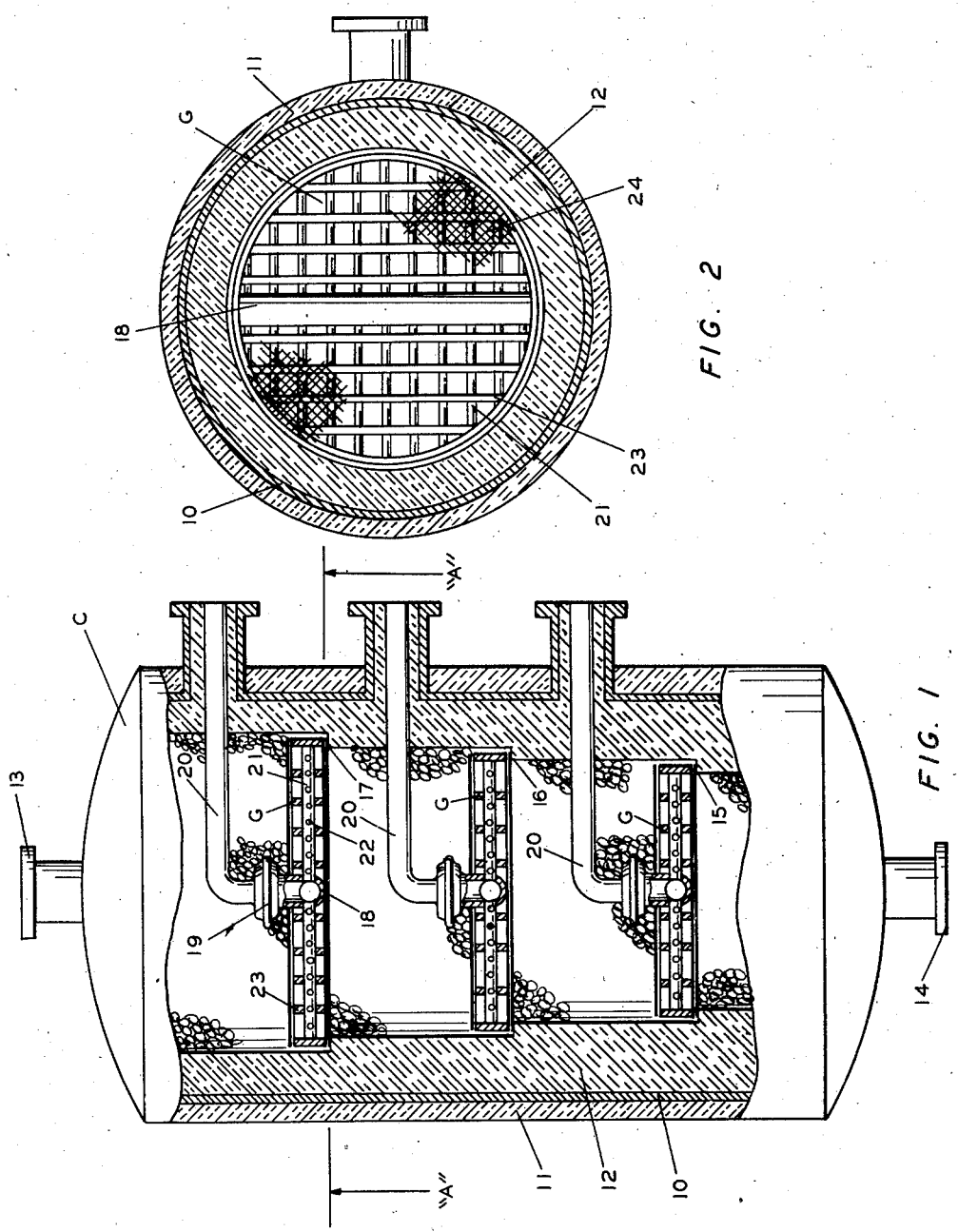
INVENTOR.
J. A. GUYER
L. G. MOLIQUE
BY
ATTORNEYS.

Dec. 2, 1947.  J. A. GUYER ET AL  2,431,803
CATALYST CHAMBER CONSTRUCTION
Filed April 24, 1943   2 Sheets-Sheet 2

INVENTORS
J.A. GUYER
L.G. MOLIQUE
BY
Hudson, Young & Jinger
ATTORNEYS

Patented Dec. 2, 1947

2,431,803

UNITED STATES PATENT OFFICE 2,431,803

CATALYST CHAMBER CONSTRUCTION

Jesse A. Guyer and Lawrence G. Molique, Bartlesville, Okla., assignors to Phillips Petroleum Company, a corporation of Delaware Application April 24, 1943, Serial No. 484,426

3 Claims. (Cl. 23—288)

This invention relates to a multi-bed catalyst chamber and particularly to the means of supporting the catalyst beds within the chamber.

The invention generally illustrates a means of supporting catalyst beds which may be generally employed but is especially applicable when the catalyst itself does not have the mechanical strength to bear up under the weight of beds above. Each bed rests on a projecting ledge of internal insulation, the insulation increasing in diameter by steps proceeding upward. It is an advantage of the invention that an insulating material has been found with sufficient strength to resist the shearing forces of the weight of the catalyst material and thus eliminates the use of a metal supporting element attached to the steel shell of the chamber.

Aside from the simplicity of the supporting arrangement in the catalyst chamber, there is a second very important advantage for a catalyst chamber of this type where the catalyst is in separate and distinct beds within the chamber and where the beds increase in diameter upwardly in the chamber and decrease in depth of bed upwardly in the chamber. The indicated increase in diameter and decrease in depth of the catalyst beds are so varied as to provide beds of varying volume. In regenerating the catalyst by burning off carbon deposit, it is necessary to bring in the air and diluent inert gas at a high enough temperature to ignite the carbon as well as keep the catalyst mass up to the temperature used during hydrocarbon conversion. If the catalyst and chamber interior were allowed to cool, a great deal of hydrocarbon would go through unconverted after switching back on the process cycle, until the beds were heated up again by the sensible heat of the petroleum vapors. Combustion of the carbon in regeneration liberates a large amount of heat, the major portion of which is absorbed by the inert vapor mixed with the air so that the accompanying temperature rise is limited to some volume that will not injure either the catalyst or equipment, 1400° F. for instance. As the entering regenerative gas is at a relatively high temperature already, say 1100° F., a large proportion of inert gas must be mixed with the air to limit the rise in temperature to a safe figure. Considerable expense is involved in supplying this inert diluent.

By arranging the catalyst in several beds with spaces between for intermediate gas injection, relatively cool regenerative gases may be used for all beds but the first since the effluent gases from the first bed at 1400° F. will heat the cool gases to 1100° F. entering the second bed, etc., progressively through the chamber. The use of cool regenerative gas allows a considerable decrease in the percentage of inert gas employed, with a proportionate decrease in the cost of regeneration.

It is an object of the present invention to provide a catalyst chamber having a series of beds of catalyst in the chamber and means for supporting said catalyst beds within the chamber independently of each other.

It is a further object of the invention to provide an insulated catalyst chamber having a series of beds of catalyst in the chamber and stepped ledges on the insulation to support the catalyst beds within the chamber independently of each other.

Other objects and advantages will become obvious from a reference to the description to follow and the annexed drawing of which:

Figure 1 is a diagrammatic sketch of the catalyst chamber showing the supporting ledges and the supporting grids for the catalyst in elevation; and Figure 2 is a sectional view taken on the line A—A of Figure 1.

Figure 3:
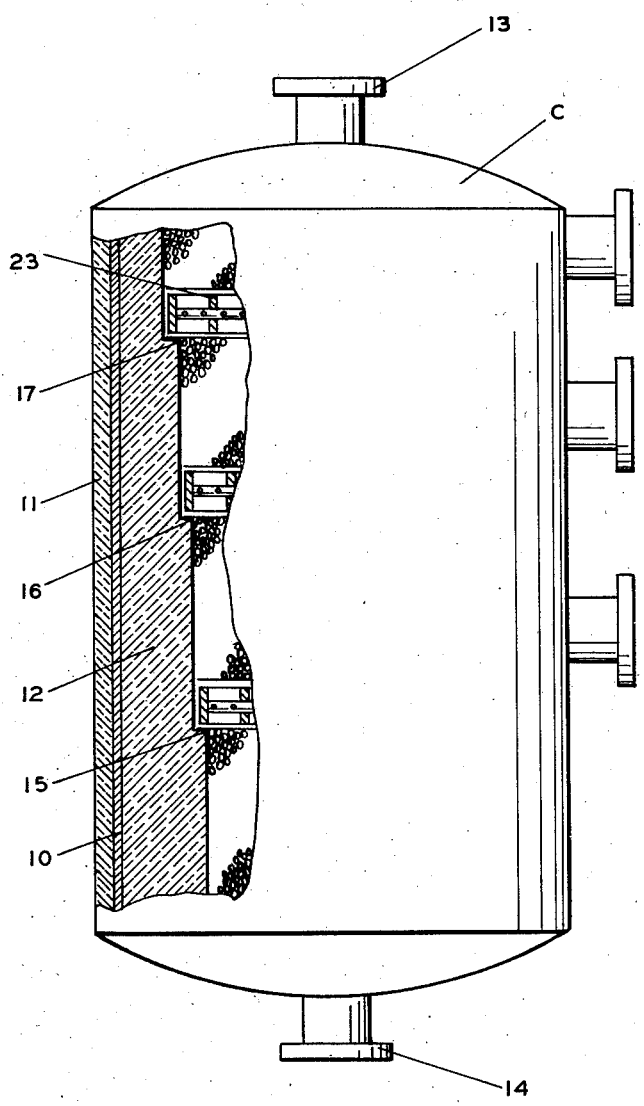
Figure 3 is a modification of the catalyst chamber of Figure 1, partly in section, and illustrating catalyst beds of increasing diameter and decreasing depth from bottom to top of the chamber.

The catalyst chamber is represented generally at C and comprises a carbon steel shell 10, an outer insulating layer 11, which may be an asbestos type insulation and an inner insulating layer 12 of a suitable refractory material to withstand the temperature.

A satisfactory refractory material with which the shell 10 may be lined to obtain the object of this invention consists of a mixture of the following compounds in the approximate proportions indicated—

| | Weight percentage |
|---|---|
| Silica | 50.61 |
| Alumina | 31.06 |
| Ferric oxide | 3.76 |
| Ferrous oxide | 2.73 |
| Calcium oxide | 10.08 |
| Titanium oxide | 1.94 |

This mixture is purchased in powder form and is commonly prepared by the admixture of water thereto in such proportion as to make it suitable for application as any cementitious lining material of this kind would normally be applied. The lining 12 after application sets by drying as is usual with cements of this general nature to provide a hard rigid form sustaining body. The top of the chamber has an inlet 13, while the bottom of the chamber has an outlet 14.

The inner insulating layer 12 is so formed as to have a series of ledges and in the present drawing the ledges are indicated at 15, 16 and 17. The insulating layer 12 increases in diameter upwardly through the chamber. Mounted on each ledge is a supporting grid G, each of which is identical and only the top grid will be described in detail. The supporting grid G comprises a main pipe 18, connecting through a flexible joint 19 with the pipe 20 which leads into the chamber from the side thereof. The pipe 18 connects to a series of pipes represented generally at 21 having a series of openings 22 to discharge regenerative gas into the chamber during the regenerative period. A series of reinforcing grids 23 is connected to the pipes 21 and on top of the grids 23 is placed a screen 24 on which the catalyst is placed.

In operation, during the conversion step, material to be catalytically treated is introduced through the inlet 13, the pipes 20 being closed. The material introduced passes down through the catalyst beds and the effluent leaves through the outlet 14. The conversion operation continues until the catalyst becomes coated with carbon and it is necessary to regenerate the same.

In regenerating the catalyst bodies, the inlet 13 and the pipes 20 are opened. Air and diluent gas are entered in controlled amounts through the respective pipes 20 and inlet 13 to ignite the carbon and burn the same from the catalyst body. The hot gases leave the bottom of the catalyst chamber through the outlet 14.

Relatively cool regenerative gases may be used for all beds subsequent to the first since the effluent gases from the first bed at 1400° F. will heat the cool gases to 1100° F. entering the second bed, etc., progressively through the chamber. The relation of the quantity of cool regenerative gases to the quantity of hot spent gases leaving the preceding bed is such that each succeeding bed must contain a larger amount of carbon than the preceding one. In this way the cool and hot gases are in the proper proportions both to give a mixture at 1100° F. as well as to contain the prescribed amount of air for carbon burnoff. This is due to the fact that the gas mixtures at 1100° F. entering the beds all contain the same percentage of oxygen, since this quantity is fixed by the allowable rise from combustion. On the other hand, the volume of spent or inert gases increases from bed to bed, so that the actual amount of air (plus diluent) added increases with each bed likewise in order to maintain the constant oxygen percentage. Obviously, more carbon must be present in each succeeding bed to balance the increased quantities of oxygen. It would be inefficient and uneconomical to supply either more or less oxygen (air) than that required by the amount of carbon present, and vice versa.

Since the flow is downward, the pressure gradient tends to make a positive seal between each bed support and the ledge upon which the bed support rests. This eliminates the need of any sealing means between bed supports and the insulation which would otherwise be necessary to prevent by-passing of regenerative gases around any space between the bed support and the insulation. It is true that the gases would immediately contact catalyst in the next layer but another problem arises when leakage occurs in this manner in that the regions adjacent the point at which the by-passed gases re-enter the next catalyst bed are not properly regenerated. Further, a positive seal prevents a movement of catalyst from one bed to a lower bed.

The above example which illustrates the invention is not to be construed as limiting the invention. It is to be understood that modification will be apparent to those skilled in the art and that no limitations are intended other than those imposed by the scope of the appended claims.

We claim:

1. A catalyst chamber having a plurality of catalyst bodies therein, comprising a shell, an outer insulation on the shell and an inner refractory insulation lining for the shell formed with ledges, said refractory insulation lining comprising a mixture of silica, alumina, ferric oxide, ferrous oxide, calcium oxide and titanium oxide, and supporting means mounted on the ledges of said lining to support the catalyst within the chamber.

2. In the combination of claim 1, the ingredients of said mixture being present in the proportions by weight as follows:

| | Weight percentage |
|---|---|
| Silica | 50.61 |
| Alumina | 31.06 |
| Ferric oxide | 3.76 |
| Ferrous oxide | 2.73 |
| Calcium oxide | 10.08 |
| Titanium oxide | 1.94 |

3. In the combination of claim 1, an inlet means for said shell, said inlet means being arranged to discharge reactants in a direction which will tend to force the supporting means against the ledges, and an outlet means for said shell.

JESSE A. GUYER.
LAWRENCE G. MOLIQUE.

REFERENCES CITED

The following references are of record in the file of this patent:

UNITED STATES PATENTS

| Number | Name | Date |
|---|---|---|
| 2,361,623 | Guyer et al. | Oct. 31, 1944 |